United States Patent
Chiappone et al.

(10) Patent No.: US 10,171,628 B2
(45) Date of Patent: Jan. 1, 2019

(54) AUGMENTED REALITY FOR SUPPORTING INTERVENTION OF A NETWORK APPARATUS BY A HUMAN OPERATOR

(71) Applicant: Telecom Italia S.p.A., Milan (IT)

(72) Inventors: Massimo Chiappone, Turin (IT); Danilo Gotta, Turin (IT); Daniela Long, Turin (IT); Elio Paschetta, Turin (IT); Nicoletta Salis, Turin (IT); Tiziana Trucco, Turin (IT)

(73) Assignee: Telecom Italia S.p.A., Milan (IT)

( * ) Notice: Subject to any disclaimer, the term of this patent is extended or adjusted under 35 U.S.C. 154(b) by 212 days.

(21) Appl. No.: 15/108,050

(22) PCT Filed: Dec. 30, 2013

(86) PCT No.: PCT/EP2013/078141
§ 371 (c)(1),
(2) Date: Jun. 24, 2016

(87) PCT Pub. No.: WO2015/101393
PCT Pub. Date: Jul. 9, 2015

(65) Prior Publication Data
US 2016/0330295 A1    Nov. 10, 2016

(51) Int. Cl.
*H04L 29/06* (2006.01)
*H04L 12/24* (2006.01)
(Continued)

(52) U.S. Cl.
CPC .............. *H04L 67/38* (2013.01); *G06F 3/011* (2013.01); *G06F 3/016* (2013.01); *G06T 19/006* (2013.01);
(Continued)

(58) Field of Classification Search
CPC .............. H04L 41/5022; H04L 47/822; H04L 67/1008; H04L 67/1012; H04L 43/0876;
(Continued)

(56) References Cited

U.S. PATENT DOCUMENTS

2011/0164163 A1* 7/2011 Bilbrey ................. G06F 1/1694
348/333.01
2013/0194304 A1* 8/2013 Latta ..................... G09G 3/003
345/633

FOREIGN PATENT DOCUMENTS

EP    1911215 A1    4/2008
EP    2469475 A1    6/2012
(Continued)

OTHER PUBLICATIONS

Murakami, "Poster: A Wearable Augmented Reality System with Haptic Feedback and Its Performance in Virtual Assembly Tasks", IEEE Symposium on 3D User Interfaces Mar. 16-17, 2013, Orlando, FL, USA (Year: 2013).*
(Continued)

Primary Examiner — Maurice L. McDowell, Jr.
(74) Attorney, Agent, or Firm — Banner & Witcoff, Ltd.

(57) ABSTRACT

A system for supporting an intervention to be carried out by a human operator on a network apparatus of a communication network is provided. The system includes a terminal device provided with a personal proxy, which is part of the equipment of the human operator. The personal proxy provides to the human operator instructions to carry out the various operations of the intervention, by displaying augmented reality elements overwritten to a live view of the network apparatus. Then, upon execution of each instruction, the personal proxy cooperates with the network management system for checking whether the instruction was properly executed, and reports the outcome to the operator (Continued)

by displaying further augmented reality elements overwritten to the live view of the network apparatus.

20 Claims, 6 Drawing Sheets

(51) Int. Cl.
    *H04L 29/08*     (2006.01)
    *G06F 3/01*     (2006.01)
    *G06T 19/00*     (2011.01)

(52) U.S. Cl.
    CPC ...... *H04L 41/0879* (2013.01); *H04L 41/0883* (2013.01); *H04L 41/22* (2013.01); *H04L 67/36* (2013.01)

(58) Field of Classification Search
    CPC .............. H04L 67/1002; H04L 67/101; H04L 41/5012; H04L 67/1031; H04L 67/38; H04L 67/36; H04L 41/0879; H04L 41/22; H04L 41/0883; G06T 19/006; G06F 3/011; G06F 3/016; G06F 2206/1012
See application file for complete search history.

(56) References Cited

FOREIGN PATENT DOCUMENTS

| WO | 2005/018249 A1 | 2/2005 |
|----|----------------|--------|
| WO | 2007/066166 A1 | 6/2007 |

OTHER PUBLICATIONS

Workflow Management Coalition, Terminology and Glossary, WFMC-TC-1011, Feb. 1999, 3.0, pp. 1-65.
May 8, 2014—(WO) International Search Report—App PCT/EP2013/078141.

\* cited by examiner

AUGMENTED REALITY FOR SUPPORTING INTERVENTION OF A NETWORK APPARATUS BY A HUMAN OPERATOR

TECHNICAL FIELD

The present invention relates to the field of communication networks. In particular, the present invention relates to a system suitable for supporting an intervention carried out by a human operator on an apparatus of a communication network.

BACKGROUND ART

The increasing complexity of communication networks and their continuous evolution aimed at supporting the deployment of new communication services entails the need to continuously upgrade the expertise of operator workforce, namely of operators in charge of physically carrying out in-field interventions on the network apparatuses, e.g. in case of failures or malfunctions signalled by customers. Training the operators in a prompt and complete way indeed allows them to intervene on apparatuses in an efficient and effective way, thereby maximizing the customer satisfaction.

On the other hand, continuously training the operator workforce may be expensive and complex. Indeed, while involving several operators in the same training event in principle would allow reducing the cost of the event, the maximum number of operators which practically may be involved in the same event is limited by the need to guarantee availability of a certain number of operators for possible interventions.

This contrast often induces network providers to reduce the number of training events, or even to avoid training events at all. This results in the inability of operators to intervene on the network apparatuses in an efficient and effective way. An operator who is not sufficiently trained indeed may be unable to carry out some interventions, or may take a long time for completing interventions, or may even need the remote assistance of a more experienced colleague.

EP 1 911 215, in the name of the same Applicant, describes an operational management platform suitable for automatically guiding an operator in the execution of interventions on resources of a communication network. The communication network is provided with a network management platform, which comprises a master application managing a layered, hierarchical structure of agents, relying on a number of resource proxies. Each resource proxy creates and manages an "image" of a respective network apparatus. The network management platform also comprises a network inventory, that collects the images of the network apparatuses and is periodically updated by retrieving information from the resource proxies. On the other hand, the operational management platform comprises an operational manager which interfaces with an expertise inventory (which comprises operator profiles and customer profiles) and an operational log (which stores all recordings of activities performed by operators and customers). The operational manager supervises the operation of a layered, hierarchical structure of operational agents, which rely on a number of personal proxies. Each personal proxy supports the activities of a respective operator, e.g. in terms of guide in the various operational activities. To this purpose, each personal proxy is provided with a respective personal interface allowing interaction between personal proxy and operator. Personal proxies are connected to resource proxies according to a peer-to-peer communication scheme, in order to issue commands, to gather configuration data of the networks apparatuses, or to gather the results of checks of successful execution of an intervention. Each personal proxy runs on a terminal device, e.g. a portable device such as a cellular phone, a PDA, a laptop, that the operator brings with him during all his in-field interventions and provides him instructions via the personal interface, e.g. in a textual form. In order to generate instructions for a certain intervention, each proxy agent executes a workflow. Workflows are distributed to the various personal proxies by the operational manager via the operational agents.

SUMMARY OF THE INVENTION

The inventors have perceived the need to improve the operational management platform described by EP 1 911 215.

In particular, the inventors have realized that the provision of instructions for the manual intervention and of the results of the check on the outcome of the intervention may be enhanced for better supporting the operators and allowing them to intervene on the apparatus in a more effective and efficient way.

According to a first aspect, the present invention provides a system for supporting an intervention to be carried out by a human operator on a network apparatus of a communication network, the system comprising a terminal device provided in the equipment of the human operator, the terminal device being provided with a personal proxy, wherein the personal proxy is configured to:

by means of the terminal device, provide to the human operator at least one instruction to carry out at least one operation of the intervention, by displaying at least one augmented reality element overwritten to a live view of at least a portion of the network apparatus;

cooperate with a network management system of the communication network for checking whether the at least one instruction was properly executed; and by means of the terminal device, report the outcome of the checking to the operator by displaying at least one further augmented reality element overwritten to the live view of at least a portion of the network apparatus.

Preferably, the terminal device is a wearable device provided with a camera suitable for framing the live view of the network apparatus, a transparent screen allowing the operator to see the live view therethrough, and a projector suitable for projecting the augmented reality element and/or the further augmented reality element on the screen.

Preferably, the system further comprises an augmented reality server and the personal proxy is provided with an augmented reality engine, the augmented reality server and the augmented reality engine being configured to cooperate according to a client-server scheme for generating and displaying the augmented reality element and/or the further augmented reality element overwritten to the live view.

Preferably, the client-server scheme is one of the following:

a client-side scheme, wherein the augmented reality engine is configured to recognize the live view for generating the augmented reality element and/or the further augmented reality element;

a server-side scheme, wherein the augmented reality server is configured to recognize the live view for generating the augmented reality element and/or the further augmented reality element; or a hybrid scheme, wherein the augmented reality engine is configured to cooperate with the augmented reality server to recognize the live view for generating the augmented reality element and/or the further augmented reality element.

Preferably, the system further comprises a tool proxy configured to manage a wearable intelligent tool comprised in the equipment of the human operator, the wearable intelligent tool being suitable for sensing movements of the human operator and to provide the human operator with a tactile feedback, the personal proxy being further configured to cooperate with the tool proxy so as to guide the human operator while he is carrying out the at least one operation wearing the intelligent tool.

Preferably, the personal proxy is configured to:

process the live view of the network apparatus for extrapolating first information on the network apparatus;

retrieving second information on the network apparatus from a network inventory of the network management system;

comparing the first information with the second information; and if a mismatch is detected between the first information and the second information, carrying out a synchronization procedure of the network inventory.

Preferably, the personal proxy is configured to, before carrying out the synchronization procedure, asking the human operator whether he wishes to synchronize the network inventory.

Preferably, the personal proxy is further configured to, if the human operator does not wish to synchronize the network inventory, allow the human operator to record in the network inventory a signalling indicating the detected mismatch.

Preferably, the personal proxy is further configured to:

upon completion of the intervention, cooperate with the network management system of the communication network for checking whether the intervention was successful;

by means of the terminal device, report the outcome of the checking upon completion of the intervention to the operator, by displaying at least one still further augmented reality element overwritten to the live view of at least a portion of the network apparatus; and if the outcome of the checking upon completion of the intervention is negative, returning to an instruction to carry out an operation of the intervention.

Preferably, the personal proxy is further configured to:

by means of the terminal device, provide to the human operator at least one further instruction to carry out at least one further operation of the intervention, by playing a voice message;

check whether the at least one further instruction was properly executed; and by means of the terminal device, report the outcome of the checking to the operator by playing a further voice message.

Preferably, the personal proxy is further configured to:

by means of the terminal device, provide to the human operator at least one further instruction to carry out at least one further operation of the intervention;

check whether the at least one further instruction was properly executed by processing the live view of the least a portion of the network apparatus; and by means of the terminal device, report the outcome of the checking to the operator.

Preferably, the personal proxy is further configured to generate a virtual image of the network apparatus and to display the virtual image of the network apparatus as a virtual layer interposed between the live view and the augmented reality element and/or the further augmented reality element.

Preferably, the personal proxy is further configured to display, overwritten to the live view of at least a portion of the network apparatus, at least one link allowing the human operator to access information on the network apparatus and/or one or more components of the network management system.

Preferably, the personal proxy is further configured to set up a communication session between the terminal device of the human operator and a further terminal device of a remote further human operator, thereby allowing the further human operator to support the human operator during the intervention on the network apparatus.

According to a second aspect, it is provided a method for supporting an intervention carried out by a human operator on a network apparatus of a communication network, wherein the method comprises the following steps, carried out by a personal proxy executed by a terminal device comprised in the equipment of the human operator:

by means of the terminal device, providing to the human operator at least one instruction to carry out at least one operation of the intervention, by displaying at least one augmented reality element overwritten to a live view of at least a portion of the network apparatus;

cooperating with a network management system of the communication network for checking whether the at least one instruction was properly executed; and by means of the terminal device, reporting the outcome of the checking to the operator by displaying at least one further augmented reality element overwritten to the live view of at least a portion of the network apparatus.

According to a third aspect, it is provided a computer program product loadable in the memory of at least one computer and including software code portions for performing the steps of the method set forth above, when the product is run on at least one computer.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
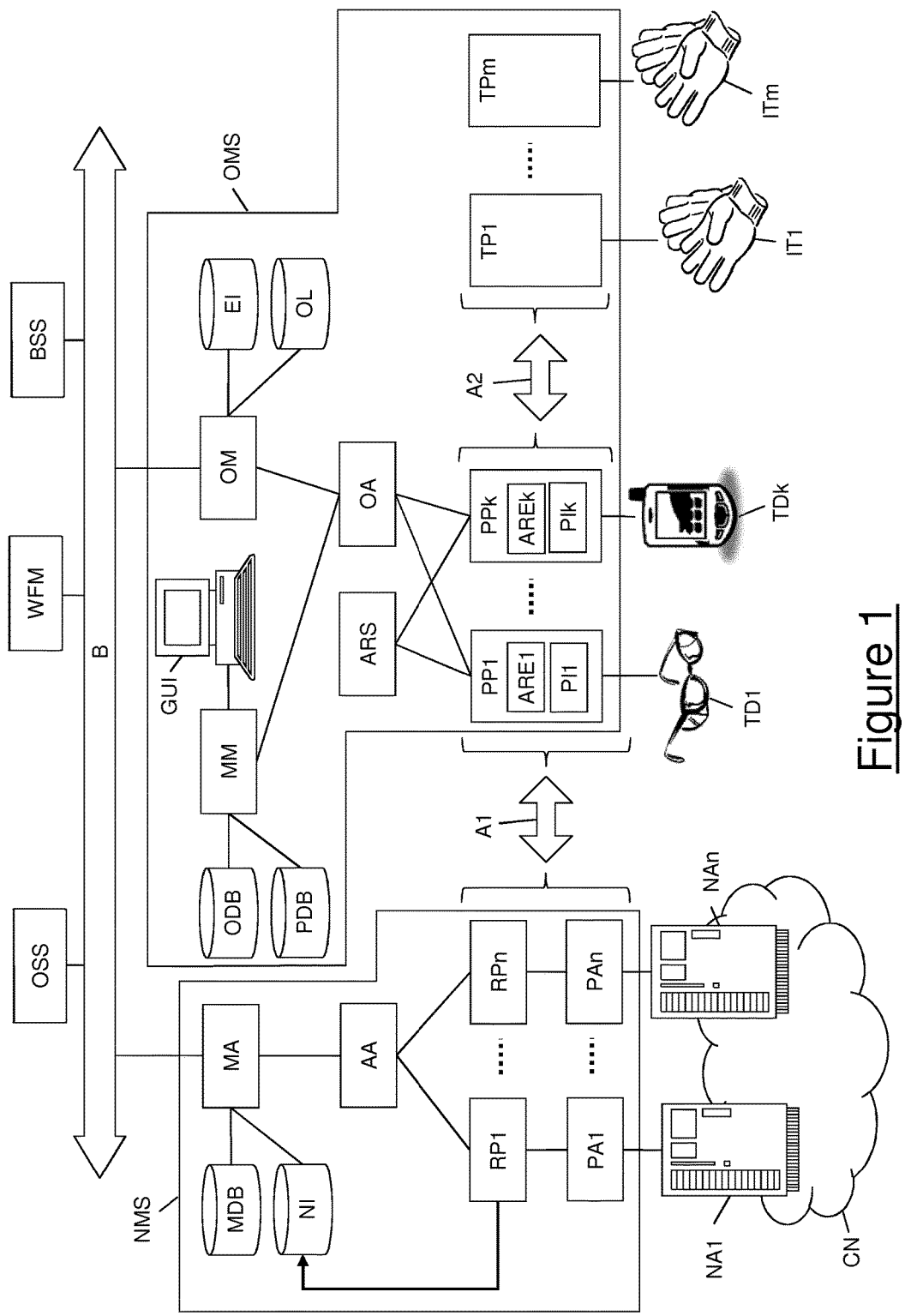
FIG. 1 shows a system for supporting an intervention carried out by a human operator on an apparatus of a communication network, according to an embodiment of the present invention.

In order to facilitate proper understanding of the invention, a glossary is set forth herein below with definitions of some terms used in the following description and in the claims:

network apparatus: an apparatus which allows a user terminal to be connected to a communication network. Such apparatus may include a network element (or network node), such as a router, a switch, a DSLAM, an ONU, an OLT, a cabinet or the like. However, for the purposes of the present invention, the apparatus may also include a personal computer, a tablet, a peripheral device (for instance a printer), an electric tool controlled by a computer, or the like connected to a communication network. For the purposes of the present invention, the apparatus may also include a telephone terminal, such as a smartphone or the like connected to a communication network.

agent: this is an autonomous process with possible persistent state and requiring communication (for example, in a collaborative and/or competitive way) with other agents in order to fulfil its tasks. This communication may be implemented through asynchronous message exchange and by using known languages (for instance, the Agent Communication Language ACL) with a well defined and commonly agreed semantic.

proxy: this is a particular type of agent suitable for managing a managed object, for example a network apparatus or one or more terminal devices comprised in the equipment of an operator.

rule: this is a scheme for constructing valid inferences. This scheme establish syntactic relations of the form "if <x> then <y> else <z>2, the "else" part being optional.

workflow: this is the automation of a process, in whole or in part, during which documents, information or tasks are passed from one participant to another for action, according to a set of procedural rules (Terminology and Glossary, WFMC-TC-1011, February-1999, 3.0). A workflow may be represented as a flowchart with a sequence of tasks ordered according to a temporal and logical dependency. Parallel or alternative branches of tasks may be also provided. Formal description of the workflow is based on known ad hoc languages, such as for instance XPDL (XML Process Descriptor Language).

process engine: it is a combination of a rule engine and a workflow engine. A rule engine includes a sophisticated "if/then" statement interpreter, namely it is used to decide, at runtime, which rules to apply and how these are to be executed, while a workflow engine is a software component which possesses all the information related to workflows, steps in a procedure and rules for each step. The workflow engine determines whether a process is ready to move on the next step. In other words, the workflow engine is a component for executing workflows. For instance, an in-field manual intervention of an operator is better represented as a workflow specifying all the activities that the operator shall carry out during the intervention, whereas a diagnosis in response to a complaint by a customer performed by a call centre operator is better represented as a set of rules. Each agent (proxies included) is preferably provided with a respective process engine.

FIG. 1 schematically shows a system for supporting an intervention carried out by a human operator on an apparatus of a communication network CN.

The communication network CN comprises a plurality of network apparatuses NA1, . . . NAn. The communication network CN may be either a fixed network or a mobile network. The network apparatuses NA1, . . . NAn comprise routers, DSLAMs, ONUs, OLTs, cabinets, etc.

The communication network CN is preferably provided with a distributed network management system NMS. The distributed network management system NMS preferably is of the type described in WO 2005/018249.

In particular, the network management system NMS preferably comprises a master application MA and a number of agent applications that, from the logical point of view, form a distributed, hierarchical structure of agents that rely on a plurality of resource proxies. For simplicity, in FIG. 1 a single agent application AA and n resource proxies RP1, . . . RPn are shown.

The master application MA is preferably configured to interact, via a bus B (e.g. a TIBCO bus) with one or more operations support systems OSS and one or more business support system BSS.

The master application MA is also preferably configured to interact with a model database MDB. The model database MDB preferably stores process descriptions (namely, workflows and rules) for network management and models of the network apparatuses NA1, . . . NAn. Preferably, the master application MA is configured to distribute workflows and/or rules for network management and related data models stored in MDB to the various agent applications (including AA) and resource proxies (including the resource proxies RP1, . . . RPn), which use them for executing network management tasks in a distributed way. The distribution of workflows/rules and data models is preferably carried out by the master application MA via suitable control agents (not shown in the drawing for simplicity), namely agents running on each host machine executing an agent application, which are responsible for controlling and managing the network management system NMS.

Each resource proxy RP1, . . . RPn is preferably configured to interface with a respective network apparatus NA1, . . . NAn via a respective protocol adapter PA1, . . . PAn. Each resource proxy RP1, . . . RPn is preferably responsible of creating and managing an "image" of the respective network apparatus NA1, . . . NAn according to a certain data model received from the master application MA.

The network management system NMS also preferably comprises a network inventory NI, that collects from the resource proxies RP1, . . . RPn the images of the network apparatuses NA1, . . . NAn. The content of the network inventory NI is preferably periodically updated by retrieving information from the resource proxies RP1, . . . RPn.

More particularly, for each network apparatus NA1, . . . NAn, the network inventory NI preferably stores one or more of the following information on the network apparatus NAi and on the site at which the network apparatus NAi is located:

identifier of the network apparatus and of the site;

type of network apparatus (e.g. ONU, DSLAM, router, cabinet, etc.);

model of network apparatus;

address of the network apparatus and of the site (city, street number, etc.);

georeferenced coordinates of the network apparatus and of the site;

one or more notes left by operator(s) that previously intervened on the network apparatus or site, wherein a note comprises general operative indications that may be useful to operators who will intervene on the same apparatus and/or site in the future. An exemplary note may be "The cabinet is located near the newsstand at the corner of Times Square"; and one or more signalling(s) left by operator(s) that previously intervened on the network apparatus or the site, wherein a signalling comprises an indication of possible troubles or anomalies that the operator(s) detected on the network apparatus or at the site but could not fix.

The network inventory NI, although being unitary from the logical point of view, according to embodiments of the invention may be physically implemented by two or more physically separated databases.

According to the present invention, the communication network CN with the distributed network management system NMS preferably cooperates with a system for supporting interventions by human operators on the apparatuses of the communication network CN. Such system is called herein after "operational management system OMS".

In particular, the operational management system OMS preferably comprises an operational manager OM and a number of operational agents that, from the logical point of view, form a distributed, hierarchical structure of operational agents which rely on a plurality of personal proxies. For simplicity, in FIG. 1 a single operational agent OA and k personal proxies PP1, . . . PPk are shown.

The operational manager OM is preferably configured to interface via the bus B with a workforce management system WFM and one or more business support system BSS.

The operational manager OM is also preferably suitable for cooperating with an expertise inventory EI and an operational log OL. The expertise inventory EI preferably stores operator profiles and customer profiles, and is preferably updated with information provided by the workforce management system WFM (as far as operator's profiles are concerned) and/or from the business support system(s) BSS (as far as customer's profiles are concerned). Besides, the operational log OL preferably stores recordings of activities performed by operators and customers.

The operational manager OM is also preferably configured to supervise the operation of the operational agents (including the operational agent OA).

Each operational agent is in turn configured to supervise the operation of a number of personal proxies. For instance, the operational agent OA shown in FIG. 1 is configured to supervise operation of the personal proxies PP1, . . . PPk. The operational agents are preferably configured to communicate with each other, for carrying out distributed execution of inter-related operation activities.

Each personal proxy PP1, . . . PPk is suitable for supporting the activities of a respective operator by executing a certain process (e.g. workflow and/or set of rules). Each personal proxy PP1, . . . PPk is preferably installed on a respective terminal device TD1, . . . TDk, which forms part of the personal equipment of the operator. For instance, a terminal device may be a portable device which the operator brings with him during the in-field interventions. In order to allow interaction with its associated operator, each personal proxy PP1, . . . PPk is preferably provided with a respective personal interface PI1, . . . PIk displayed by the terminal device TD1, . . . TDk. At least one terminal device TD1, . . . TDk is preferably configured to support augmented reality techniques, as it will be discussed in detail herein after.

The personal proxies PP1, . . . PPk are preferably capable of communicating with each other, for supporting multiple operators who shall cooperate e.g. for solving a problem involving multiple network apparatuses, or e.g. in the case of a less expert operator remotely assisted by a more experienced operator.

Besides, the personal proxies PP1, . . . PPk are also preferably configured to communicate with the resource proxies RP1, . . . RPn (by using e.g. the known Agent Communication Language ACL), as schematically indicated by the double arrow A1 of FIG. 1. The communication between personal proxies PP1, . . . PPk and resource proxies RP1, . . . RPn preferably is a peer-to-peer communication. This way, each one of the personal proxies PP1, . . . PPk may issue commands to any one of the resource proxies RP1, . . . RPn, or gather from any one of the resource proxies RP1, . . . RPn configuration data relating to the networks apparatus NA1, . . . NAn managed by that resource proxy, or gather from any one of the resource proxies RP1, . . . RPn the results of checks of successful execution of an intervention on the related networks apparatus NA1, . . . NAn.

The operation management system OMS also preferably comprises a manager module MM, which is preferably configured to interact with an operational database ODB and a performance database PDB.

The operational database ODB preferably stores processes descriptions (e.g. workflows and rules) for supporting activities of operators and data models for describing the operator profiles, that are used by the other components of the system OMS (namely, operational manager OM, operational agents and personal proxies PP1, . . . PPk) for supporting activities of the operators. The manager module MM is preferably provided with a graphical user interface GUI enabling population of the operational database ODB by addition of new processes, workflows, rules and data models. Preferably, the manager module MM is configured to distribute processes for supporting activities of operators and related data models to the operational agents (including the operational agents OA) and personal proxies (including the personal proxies PP1, . . . PPk). The distribution of workflows/rules and data models is preferably carried out via suitable control agents (not shown in the drawing for simplicity), namely agents running on each host machine executing an operational agent, which are responsible for controlling and managing the operational management system OMS.

As to the performance database PDB, it preferably stores information on performance of operation management system OMS. Performance information are preferably gathered by the above mentioned control agents.

According to the present invention, the operational management system OMS is configured to interact with the operators through augmented reality techniques. As known, the expression "augmented reality", or briefly AR, indicates a live view of a physical, real-world environment whose elements are augmented (or supplemented) by computer-generated sensory input such as sound, video, graphics, etc.

In order to support AR-based interaction with operators and/or customers, the operational management system OMS preferably comprises an augmented reality server ARS at the server side, while each personal proxy PP1, . . . PPk is preferably provided with a respective augment reality engine ARE1, . . . AREk.

Each augmented reality engine ARE1, . . . AREk, in particular, is configured to allow the respective personal proxy PP1, . . . PPk, during execution of the respective process for supporting the activities of an operator, to carry out the steps that require AR techniques.

Besides, each terminal device TD1, . . . TDk is preferably suitable for supporting AR techniques. To this purpose, each terminal device TD1, . . . TDk is preferably provided with a respective camera suitable for framing a scene (in particular, a live view of at least a portion of the network apparatus upon which intervention shall be carried out) and a display suitable for showing to the operator his personal interface PI1, . . . PIk, that comprises both the framed live view and one or more AR elements overwritten to the live view. An AR element may comprise:

text, such as for instance textual information on the network apparatus or textual instructions to the operator; and/or non-textual graphical object (e.g. a symbol or an icon) indicating e.g. the position of specific components (e.g. a board, a port, etc.) of the network apparatus.

The terminal device TD1, . . . TDk (that, as mentioned above, preferably is a portable device) preferably is a smartphone or tablet provided with camera and display. According to particularly preferred embodiments, the terminal device TD1, . . . TDk is a wearable device, such as for instance a pair of "AR glasses", namely glasses with embedded processor, connectivity to the communication network CN (either a mobile connection or a wireless connection via e.g. Bluetooth or Wi-Fi), camera and a projector suitable for projecting AR elements on at least one of the lenses, so that the AR elements are superimposed to the real scene that the operator sees through the lenses. Alternatively, the terminal device TD1, . . . TDk may be an "AR helmet" with visor and embedded processor, connectivity to the communication network CN (either a mobile connection or a wireless connection via e.g. Bluetooth or Wi-Fi), camera and a projector suitable for projecting AR elements on the visor, so that the AR elements are superimposed to the real scene that the operator sees through the visor. Using a wearable terminal device is advantageous in that the camera of the wearable terminal device automatically frames the visual field of the operator and in that the operator has both his hands free and available for the intervention.

Preferably, the augmented reality server ARS is configured to cooperate with the personal proxies PP1, . . . PPk and their augmented reality engines ARE1, . . . AREk for implementing AR techniques during execution of processes (e.g. workflows and/or rules) supporting the activities of operators. Such implementation is preferably based on any one of the following interaction schemes:

(i) client-side scheme: the augmented reality engines ARE1, . . . AREk are responsible of recognizing the scene framed by the camera of the terminal device TD1, . . . TDk and of superimposing or overwriting proper AR elements (provided to them by the augmented reality server ARS) to the live view on the display of the terminal device TD1, . . . TDk. In this case, the augmented reality server ARS is not used to recognize the scene, but it may be used to give to the augmented reality engines ARE1, . . . AREk data allowing them to perform the recognition and the proper AR contents to be superimposed to the live view (and/or possible following actions—e.g. seeing related images/videos/comments—for these AR contents);

(ii) server-side scheme: the augmented reality server ARS is responsible of recognizing the live view and providing the augmented reality engines ARE1, . . . AREk with the proper AR elements to be superimposed or overwritten to the live view. The augmented reality engines ARE1, . . . AREk are in turn responsible of transmitting the framed live view to the augmented reality server ARS and superimposing or overwriting the AR elements generated by the augmented reality server ARS to the live view on the display of the terminal device TD1, . . . TDk; or (iii) hybrid scheme: the augmented reality engines ARE1, . . . AREk interact with the augmented reality server ARS for recognizing the framed live view and generating the proper AR elements to be superimposed or overwritten to the live view. For instance, at the purpose of recognizing the framed live view, the augmented reality engines ARE1, . . . AREk may use information retrieved from the augmented reality server ARS, e.g. a set of reference images to be compared with the framed live view, georeferenced coordinates or other technical information useful to improve the augmented reality experience. Similarly, for generating the AR elements to be superimposed or overwritten to the live view, the augmented reality engines ARE1, . . . AREk may select them from a plurality of AR elements available at the Augmented Reality Server ARS.

According to particularly preferred embodiments, the operational management system OMS preferably also comprises a number of tool proxies TP1, . . . TPm. Each tool proxy TP1, . . . TPm is preferably responsible for managing a respective intelligent tool IT1, . . . ITm comprised in the equipment of the operators. The word "intelligent tool" indicates herein after a wearable tool for manual interventions or training sessions on the network apparatuses (e.g. a pair of gloves) which is provided with the capability to sense the movements of the operator (in particular, his hands in case of gloves) and to provide him a feedback (e.g. a vibration) so as to physically guide him during the manual intervention or training session. Each tool proxy TP1, . . . TPm is further preferably configured to communicate with the personal proxies PP1, . . . PPk (by using e.g. the known Agent Communication Language ACL), as schematically indicated by the double arrow A2 of FIG. 1. For allowing a tool proxy TP1, . . . TPm to communicate with a personal proxy, the intelligent tool IT1, . . . ITm is preferably configured to connect to the communication network CN, e.g. via a mobile connection. Alternatively, the intelligent tool IT1, . . . ITm may be configured to support a wireless communication (e.g. via Bluetooth or Wi-Fi) with the terminal devices TD1, . . . TDk. The communication between personal proxies PP1, . . . PPk and tool proxies TP1, . . . TPm preferably is a peer-to-peer communication.

The operation of the system shown in FIG. 1 according to a first embodiment of the present invention will be now described in detail with reference to the flow chart of FIG. 2.

According to such embodiment, the personal proxy PPj running on the terminal device TDj of the operator in charge of performing a certain intervention on a certain network apparatus NAi (e.g. following to a malfunction signalling made by a customer) preferably executes a workflow configured to support the whole intervention of the operator step-by-step. The operator is preferably selected by the workforce management system WFM. The workflow may be retrieved from the operational database ODB and then provided to the proxy server PPj when the intervention is assigned to the operator. Alternatively, the workflow may be already available for execution by the proxy server PPj on the terminal device TDj, before the intervention is assigned to the operator. Examples of workflows are a workflow for installing and configuring a modem, a workflow for repairing a failure of a network apparatus (e.g. a DSLAM, a router, etc.).

The workflow both automatically interacts with management systems (e.g. OSS, NMS), for displaying or modifying information, and guides the operator during manual activities.

A detailed description of the steps carried out by the workflow will be provided hereinafter with reference to the flow chart of FIG. 2.

During a first step 200, the workflow preferably asks the operator—via the personal interface PIj of the personal proxy PPj—to frame the network apparatus NAi by means of the camera of his terminal device TDj. Such request may be a text request displayed on the terminal device TDj. Alternatively, such request may be in the form of an audio request.

Then, at step 201, the workflow preferably extrapolates first information info1 on the network apparatus NAi. Such first information info1 preferably comprise type and model of the network apparatus NAi extrapolated via AR techniques from the framed live view provided by the camera of the terminal device TDj at step 201. Such AR-based extrapolation is preferably carried out by the workflow with the aid of the augmented reality server ARS and the augmented reality engine of the personal proxy PPj according to any one of the three interaction schemes (i), (ii), (iii) described above. The first information info1 also preferably comprise address and georeferenced coordinates of the network apparatus NAi as detected by the terminal device TDj (e.g. by means of a GPS receiver embedded within the terminal device TDj).

The workflow also preferably retrieves second information info2 on the network apparatus NAi from the network inventory NI (step 202). Step 202 is preferably carried out substantially in parallel with steps 200 and 201. The second information info2 preferably comprise type and model of the network apparatus NAi stored in the network inventory NI. The second information info2 also preferably comprise address and georeferenced coordinates of the network apparatus NAi as stored in the network inventory NI. For retrieving the second information info2 from the network inventory NI, the workflow preferably operates according to any one of the following alternatives:

the description of the intervention to be carried out contains explicitly the identifier of the network apparatus NAi. In this case, the workflow preferably uses the identifier of the network apparatus NAi contained in the description for querying the network inventory NI and retrieving the second information info2; or the description of the intervention to be carried out does not contain explicitly the identifier of the network apparatus NAi. In such case, the workflow preferably traces indirectly the identifier of the network apparatus NAi starting from other information comprised in the description of the intervention. For instance, if the intervention stems from a complaint by a client, the workflow may derive the identifier of the network apparatus NAi starting from the network route of the client. Alternatively, the identifier may be retrieved starting from a RFID tag or a QR code associated to the network apparatus NAi. Alternatively, the workflow uses the georeferenced coordinates of the network apparatus NAi, as provided by a GPS received embedded within the terminal device TDj, for querying the network inventory NI.

Then, at step 203, the workflow preferably compares the first information info1 with the second information info2.

If there is a mismatch between them (e.g. the apparatus model comprised in info1 is different from the apparatus model comprised in info2), the workflow preferably asks the operator—via the personal interface PIj of the personal proxy PPj—whether he wishes to synchronize the network inventory NI (step 204). Such request may be a text request displayed by the display of the terminal device TDj. Alternatively, such request may be in the form of an audio request. The operator preferably replies to such request by means e.g. of a voice command.

If the operator wishes to perform a synchronization, the workflow starts a synchronization procedure (step 205), during which the workflow basically replaces the second information info2 stored in the network inventory NI with first information info1.

If the operator does not wish to perform any synchronization, the workflow preferably asks him if he wishes to leave a signaling indicating the detected mismatch (step 206). The operator preferably replies also to such request by means e.g. of a voice command.

In the affirmative, the signaling is recorded into the network inventory NI with the other information relating to the network apparatus NAi (step 207).

According to alternative embodiments, steps 204, 206 and 207 are omitted and the workflow automatically executes the synchronization procedure of step 205. According to such embodiments, the workflow may inform the operator about the completed synchronization via the personal interface PIj.

The workflow then preferably checks whether the network inventory NI stores any note and/or signaling relating to the network apparatus NAi and left by operator(s) that previously intervened on the same apparatus and/or on the same site (step 208). In the affirmative, the workflow preferably asks the operator if he wishes to read them (step 209). The operator preferably replies also to such request by means e.g. of a voice command.

In the affirmative, the workflow preferably displays the note and/or signaling via the personal interface PIj of the terminal device TDj (step 210). Preferably, any note and/or signaling is displayed on the display of the terminal device TDj via AR techniques, namely in the form of text over-written or superimposed to the scene framed by the terminal device TDj. After the operator has read the note and/or signaling, he preferably provides a command (e.g. a voice command) to the terminal device TDj to cancel the note and/or signaling from the display (step not shown in the drawing).

Then, at step 211, the workflow preferably provides to the operator detailed instructions on the intervention to be carried out on the network apparatus NAi (or on the identified component of the network apparatus NAi). The single operations to be executed during the intervention are preferably illustrated in detail. Moreover, the workflow may also check correct execution of each single operation, possibly through interaction with the Resource Proxy RPi responsible to manage the network apparatus NAi. A feedback is also preferably provided on the outcome of each single operation to the operator. Step 211 preferably is carried out using AR techniques, namely by displaying on the terminal device TDj one or more AR elements superimposed to the scene framed by the camera of the terminal device TDj. Also one or more intelligent devices, if present in the equipment of the operator, are preferably involved in step 211. A detailed description of step 211 with reference to an exemplary workflow will be provided hereinafter.

Then, at step 212, the workflow preferably checks if the intervention was successful. For instance, if the intervention was aimed at fixing a problem signaled by a customer, the workflow preferably checks whether the problem is fixed. If the intervention was instead aimed at configuring a component (e.g. a port), the workflow preferably checks whether the component is correctly configured. At step 212, if needed, the workflow preferably interacts with the Resource Proxy RPi responsible to manage the network apparatus NAi. A feedback is also preferably provided on the outcome of the intervention to the operator. The feedback is preferably provided using AR techniques, namely by displaying on the display of the terminal device TDj one or more AR elements superimposed to the scene framed by the camera of the terminal device TDj. A detailed description of step 212 with reference to an exemplary workflow will be provided herein after.

If the outcome of the intervention is negative, the workflow preferably returns to any of the instructions specified therein, so as to guide again the operator through at least part of the intervention (step 211).

Otherwise, the workflow asks the operator whether he wishes to record a note and/or a signalling in the network inventory NI (step 213). In the affirmative, the workflow records in the network inventory NI the note and/or signalling left by the operator (step 214). The operator may both reply to the invitation of step 214 and provide the note and/or signalling e.g. in the form of voice commands. According to alternative embodiments the operator indicates that he wants to leave a note and/or signalling in the network inventory NI; the operator may provide both indication and note and/or signalling e.g. in the form of voice commands.

Hereinafter, steps 211 and 212 of the flow chart of FIG. 2 will be described in further detail by referring to an exemplary scenario wherein the intervention to be carried out on the network apparatus NAi is changing connection of a customer from a first port (old port) to a second port (new port) of the apparatus NAi, e.g. following to a malfunction signalling by a customer.

Figure 3B:
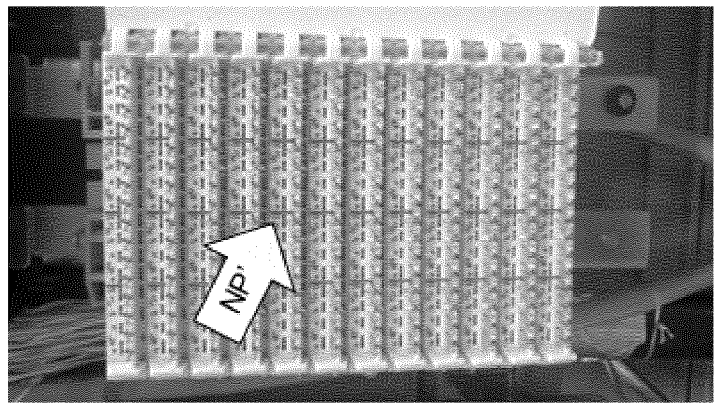
FIGS. 3a and 3b show two scenes framed by a terminal device, in a first exemplary scenario.
Figure 3A:
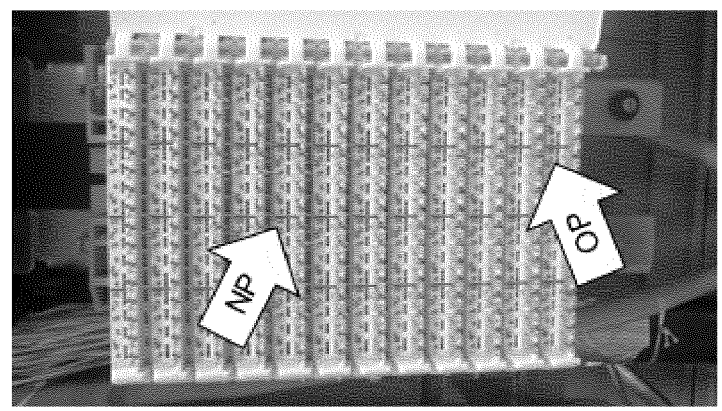

At step 211, the workflow preferably shows to the operator both the old port and the new port by means of AR techniques. In particular, the workflow, by exploiting cooperation between the augmented reality engine of the personal proxy PPj and the network management system NMS knowing the right new port to be proposed to the operator, preferably generates two AR elements NP and OP and, as shown in FIG. 3a, overwrites them to the image of the network apparatus NAi shown by the display of the terminal device TDj of the operator, so that they indicate the position of the old port and the new port, respectively. In this case, the augmented reality engine of the personal proxy PPj locally creates the proper mapping between the positions of the AR elements NP and OP in the framed scene and the pixels of the display of the terminal device TDj. The AR elements NP and OP may be for example arrows (as shown in FIG. 3a by way of example) or dots. In order to allow the network operator to distinguish NP from OP, both the AR elements NP and OP may include an explanatory text, e.g. in the form of a label attached to the arrow or dot. Alternatively, the two AR elements may be coloured so as to unambiguously indicate old port and new port. For instance, the AR element OP indicating the old port may be red, while the AR element NP indicating the new port may be yellow.

Then, during step 211, the workflow preferably instructs the operator to disconnect the cable of the customer from the old port indicated by the AR element OP and to connect the cable to the new port indicated by the AR element NP. During step 211, the workflow also preferably checks the correct execution of each single instruction and provides a feedback to the operator for each instruction.

According to a first embodiment, instructions and feedbacks are provided in the form of voice messages. In particular, each instruction is preferably provided in the form of one or more voice messages (e.g. "disconnect cable from port indicated with red arrow" and "connect cable to port indicated by yellow arrow") played by the terminal device DTj. Then, if the execution of an instruction by the operator (e.g. disconnection of the cable from the old port) entails the generation of an event or alarm, upon execution of the instruction, the workflow preferably instructs the Resource Proxy RPi to check whether the event or alarm was generated and, in the affirmative, preferably concludes that the instruction was properly executed. The workflow then preferably provides to the operator a positive feedback on the correct execution of the instruction in the form of an audio message, and then passes to the next instruction. Otherwise, if the execution of an instruction by the operator does not entail the generation of an event or alarm, the workflow preferably waits for a feedback by the operator (provided e.g. via a voice message), and then passes to the next instruction.

According to other embodiments, instructions and feedbacks are provided by means of AR techniques. In particular, each instruction is provided in the form of one or more AR elements displayed by the terminal device DTj superimposed to the live view, e.g. text labels "disconnect cable from port indicated with red arrow" and "connect cable to port indicated by yellow arrow"). The AR elements may also totally cover the framed real scene. Then, if the execution of an instruction by the operator (e.g. disconnection of the cable from the old port) entails the generation of an event or alarm, upon execution of the instruction, the workflow preferably instructs the Resource Proxy RPi to check whether the event or alarm was generated and, in the affirmative, preferably concludes that the instruction was properly executed. Otherwise, if the execution of an instruction by the operator does not entail the generation of an event or alarm, the workflow may check whether the instruction was properly executed using AR techniques (namely, by processing the framed live view of the network apparatus NAi to "see" whether the effects of the proper execution of the instruction are visible in the scene). In any case, if the outcome of the check is positive, the workflow preferably provides to the operator a positive feedback on the correct execution of the instruction by displaying one or more AR elements, and then passes to the next instruction. For instance, if the instruction of connecting the cable to the new port indicated by the AR element NP was properly executed, the workflow preferably modifies the AR element NP into (or replace the AR element NP with) a modified AR element NP' (see FIG. 3b). For instance, if the color of the AR element NP was initially yellow, the color of the modified AR element NP' may be half yellow and half green, so as to indicate that the connection of the cable to the new port has been properly executed as such, but that a final check on the outcome of the intervention (namely, the check on whether the connectivity of the customer has been restored) still need to be carried out. Otherwise, if the execution of an instruction by the operator does not entail the generation of an event or alarm and no AR-based check is possible, the workflow preferably waits for a feedback by the operator, and then passes to the next instruction.

According to still other embodiments, instructions and feedbacks are provided by means of AR techniques in combination with the use of an intelligent tactile tool (e.g. the above mentioned intelligent gloves). In such case the workflow preferably guides the operator during the execution of an instruction, so as to guarantee that it is properly executed. In such case, the operator preferably wears the intelligent tactile tool and indicates that he is starting the execution of the instruction (e.g. by means of a voice message). Such an indication advantageously activates a tactile feedback functionality of the intelligent tool. The operator then starts executing the instruction using the intelligent tactile tool. As he moves his hand, the tactile tool preferably detects the movement and reports it to the workflow that determines whether the movement is correct or not. If the movement is not correct, the workflow (via the tool proxy of the intelligent device) preferably induces the intelligent tool to provide the operator with a tactile feedback (e.g. a vibration, an increase of temperature, etc.) which informs him that is performing an incorrect action. For instance, the operator may perceive a vibration of the intelligent tactile tool indicating to him that he is operating on the wrong port. In such case, the workflow may automatically detect from the intelligent tool when the execution of an instruction is completed and whether the execution was successful. Such automatic detection may alternative to or combined with the above described mechanism (namely, detection of event or alarm, feedback by the operator, check by means of AR techniques). After the proper execution of an instruction involving use of the tool is completed, the workflow preferably deactivates the feedback functionality of the intelligent tool and passes to the next instruction.

Within the system OMS, some of the workflows executed by the personal proxies PP1, . . . PPk may use the above mechanism based on voice massage, while other workflows may use the above mechanism based on AR techniques and still other workflows may use the above mechanism based on AR techniques with intelligent tools. According to some variants, the above mechanisms based on voice messages, AR techniques and AR techniques with intelligent tool may be combined within a same workflow. For instance, an instruction of a workflow and the relating feedback may be provided to the operator as a voice message, while the subsequent instruction of the same workflow and the related feedback may be provided via AR techniques, whereas the still subsequent instruction may be carried out with the aid of an intelligent tool.

After all the instructions for the intervention have been properly executed, as mentioned above workflow preferably checks if the intervention was successful, namely if the intervention of the operator (which as such has been properly executed, as checked step-by-step by the workflow at step 211) has reached the aim of the intervention (e.g. has solved the malfunctioning problem signaled by the customer) (step 212). For instance, in the exemplary scenario of the port change, the workflow preferably instructs the network management system NMS to reconfigure the circuit including the new port, to check the connectivity of the reconfigured circuit and to provide a feedback on the check.

At step 212, the workflow also preferably provides a feedback on the final check to the operator by means of AR techniques. For instance, if the port change was successfully carried out (the connectivity of the customer being restored), the workflow preferably still modifies the AR element NP' into (or replace the AR element NP with) a still modified AR element NP''. For instance, if the AR element NP indicating the new port was yellow and the modified AR element NP' was half yellow and half green, at step 212 its color is changed to full green. Alternatively (or in addition), a textual label with an indication of the successful intervention (e.g. "ok") may be added to the AR element NP.

Figure 2:
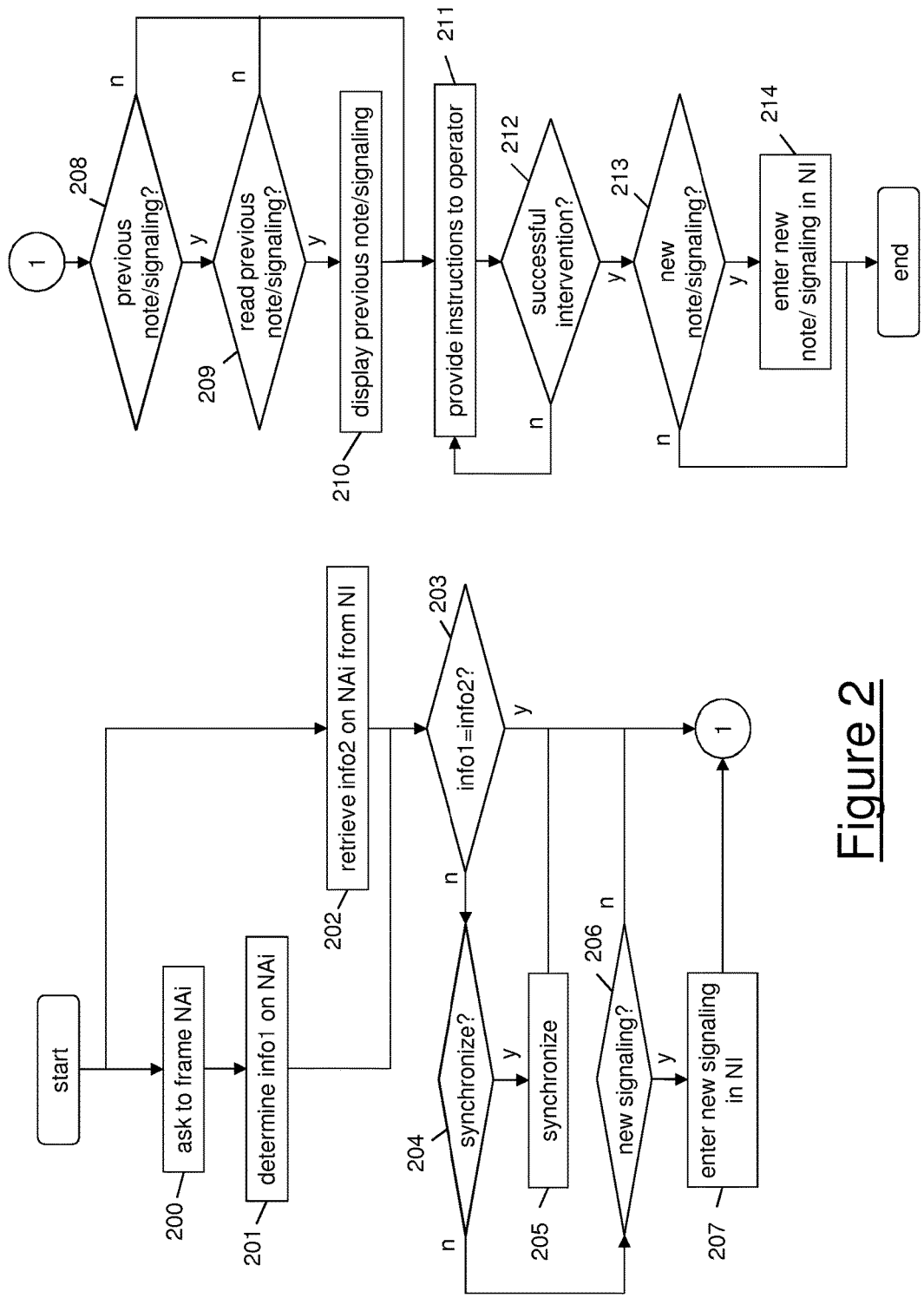
FIG. 2 is a flow chart of the operation of the system of FIG. 1, according to a first embodiment.

According to a variant of the flow chart of FIG. 2, in addition to AR techniques, also virtual reality techniques are preferably used for easing interaction between workflow and operator.

According to such variants, at step 200 the personal interface PPj of the terminal device TDj shows to the in-field operation a virtual image of the network apparatus NAi, thereby covering the live view of the network apparatus NAi by a virtual layer interposed between live image and AR elements. This is particularly advantageous when recognition of the network apparatus NAi by means of AR techniques is particularly difficult, or when the live view does not allow the in-field operator to understand the operational environment (for instance, where too many wires or cables obstruct a clear view of the network apparatus components). The virtual image of the network apparatus NAi is preferably reconstructed (e.g. based on a picture of the network apparatus NAi or on a CAD image of the apparatus) via interaction of the personal proxy PPj with the distributed network management system NMS.

According to such variants, step 205 of synchronizing the network inventory NI is carried out by the operator by acting upon the virtual image of the network apparatus NAi.

Further, at step 211, the AR elements showing in detail instructions and feedbacks are preferably overwritten to the virtual image of the network apparatus NAi. When the operator has carried out a manual operation (e.g. the operator shall extract a board from the network apparatus NAi), the workflow preferably checks the successful execution of the manual operation and provides a feedback to the operator on the virtual image, using AR techniques. The virtual image of the network apparatus NAi is also modified for reflecting the modification of the real apparatus resulting from the manual operation.

Also the result of the final check carried out at step 212 is preferably provided on the virtual image.

Therefore, thanks to the use of AR technique, the personal proxy PP is capable of providing instructions and/or feedbacks on the execution of instructions (or of the whole intervention) to the operator in a very efficient and intuitive way. Indeed, differently from plain textual instructions/feedbacks or audio instruction/feedbacks, the provision of instructions and/or feedbacks by means of AR elements superimposed to the real scene that the operator sees through the display of its AR terminal device advantageously provide very precise indications to the operator, in a much more intuitive way. The operator may then easily follow the instructions, and may carry out complex interventions even in case he is not very experienced, since the AR elements guide him is a very precise way. This ultimately results in the capability of the operator to intervene on the network apparatus in a more effective and efficient way.

This is helpful also for the purpose of training operators, since the workflow itself—using the AR elements—acts as a trainer that guides the operator step-by-step through the whole intervention procedure.

In the flow chart of FIG. 2 and in the above example referred to a port change intervention, it has been assumed that the workflow is configured to support all the intervention of the operator on the network apparatus NAi, thereby guiding him step-by-step throughout all the activities of the intervention in a detailed manner.

According to other embodiments, the workflow is configured to support only a specific manual activity on the network apparatus NAi. In such case, the execution of the workflow may be invoked by the operator as he wishes to perform that specific activity. An exemplary workflow of this type, for instance, may be configured for enabling the operator to synchronize content of the network inventory NI, as it will be described hereinafter with reference to FIGS. 4a and 4b.

It is assumed that a workflow is configured to instruct the operator to check whether the actual position of the remote power supply in the network apparatus NAi—e.g. a cabinet for a broadband network architecture using optical fiber (FTTCab) connected with an Optical Network Unit (ONU)—is the same as indicated in the network inventory NI.

Figure 4B:
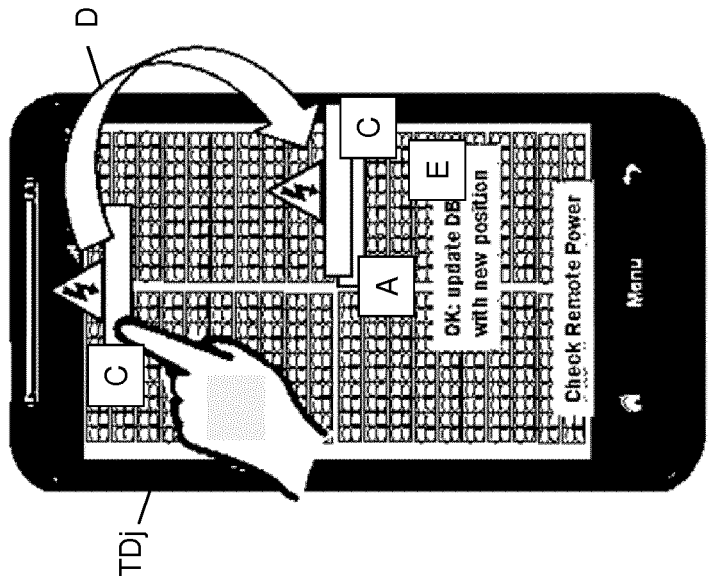
FIGS. 4a and 4b show two scenes framed by a terminal device, in a second exemplary scenario.
Figure 4A:
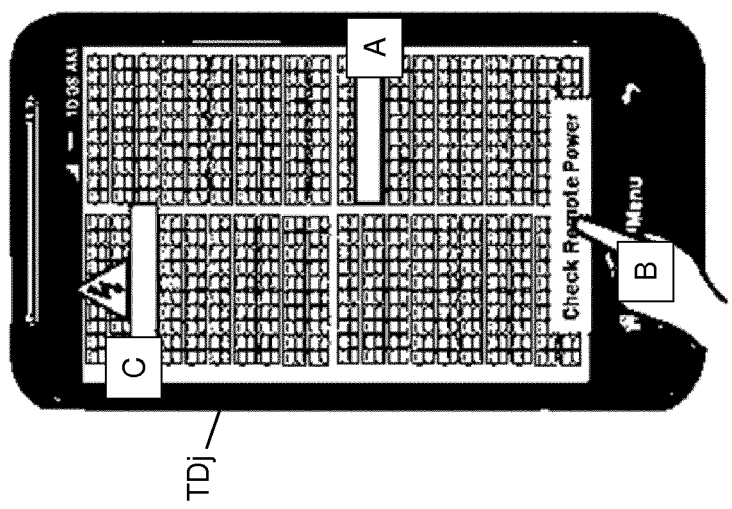

For safety reasons, the remote ONU power supply in the cabinet switch matrix is typically covered by a plastic strip of a well-visible color (e.g. yellow), which is indicated as "A" in FIG. 4a. The workflow executes the following steps:

a) it preferably asks the operator to frame the cabinet switch matrix with the camera of his terminal device TDj;

b) by means of AR techniques, it preferably recognizes the switch matrix of the cabinet. Such AR-based recognition is preferably carried out by the workflow with the aid of the augmented reality server ARS and the augmented reality engine of the personal proxy PPj according to any one of the three interaction schemes (i), (ii), (iii) described above. Additional, it preferably shows on the display of the terminal device TDj an AR element (indicated as "B" in FIG. 4a) suitable for starting the power supply position check. The AR element may be e.g. an icon or label with a written text such as "Check remote power", as shown in FIG. 4b.

c) as the operator clicks the AR element B, thereby starting the power supply check, the workflow preferably queries the network inventory NI for retrieving the position of the remote power supply within the switching matrix. Then, preferably, the workflow preferably shows on the display of the terminal device also a further AR element (indicated as "C" in FIG. 4c) for indicating the position of the remote power supply as retrieved from the network inventory NI.

d) the operator then visually checks whether the position of the AR element C corresponds with the position of the plastic strip A. In the affirmative, the outcome of the procedure is positive and no other actions have to be taken. Otherwise, the operator may check with proper electrical instruments the actual position of the remote power supply. If the operator determines that the actual position of the remote power supply is that indicated by the plastic strip (or, more generally, is other than that indicated by the AR element C), the operator preferably synchronizes the network inventory NI. Preferably, such synchronization is carried out using AR techniques. For instance, the operator may touch the AR element C on the display of its terminal device TDj and displace it to the actual position of the remote power supply, as indicated by the arrow D in FIG. 4b.

e) the workflow preferably automatically recognizes the displacement of the AR element C by means of AR techniques. Such AR-based recognition is preferably carried out by the workflow with the aid of the augmented reality server ARS and the augmented reality engine of the personal proxy PPj according to any one of the three interaction schemes (i), (ii), (iii) described above. Then, the workflow preferably updates the information on the position of the remote power supply in the network inventory NI.

f) the workflow displays a further AR Element E on the display of the terminal device TDj, which provides a feedback on the positive outcome of the synchronization procedure.

Therefore, advantageously, use of AR techniques allow also the operator to provide information to the network management system NMS via the operational management system OMS in a very intuitive way. This advantageously contributed to increase effectiveness and efficiency of the intervention by the operator.

Alternatively or in addition to the above described workflow-based specific support offered to operators, the system OMS may also be configured to offer a more generic support to operators who shall intervene on the network apparatus NAi, in case the operational database ODB does not store any workflow configured to provide support for the specific type of intervention that shall be carried out, or if the operator does not wish to be supported by any workflow.

The operation of the system OMS in this scenario is described hereinafter with reference to the flow chart of FIG. 5.

As the operator arrives into proximity of the network apparatus NAi, bringing with him its terminal device TDj, he requires to the personal proxy PPj to start the execution of a process configured to generically support an operator intervening on the network apparatus NAi (or on the identified component of the network apparatus NAi). According to first variants, the process is a workflow. According to other variants, the process is a code directly written in a programming language (e.g. Java). Alternatively, execution may be automatically started by a triggering event detected by the terminal device TDj. For instance, execution of the process may be automatically started by the personal proxy PPj as the terminal device TDj detects (e.g. by means of an RFID reader or a GPS receiver) that the operator is close to the network apparatus NAi. In such case, the personal proxy PPj preferably asks the operator to confirm that he wishes to start the execution of the process.

Figure 5:
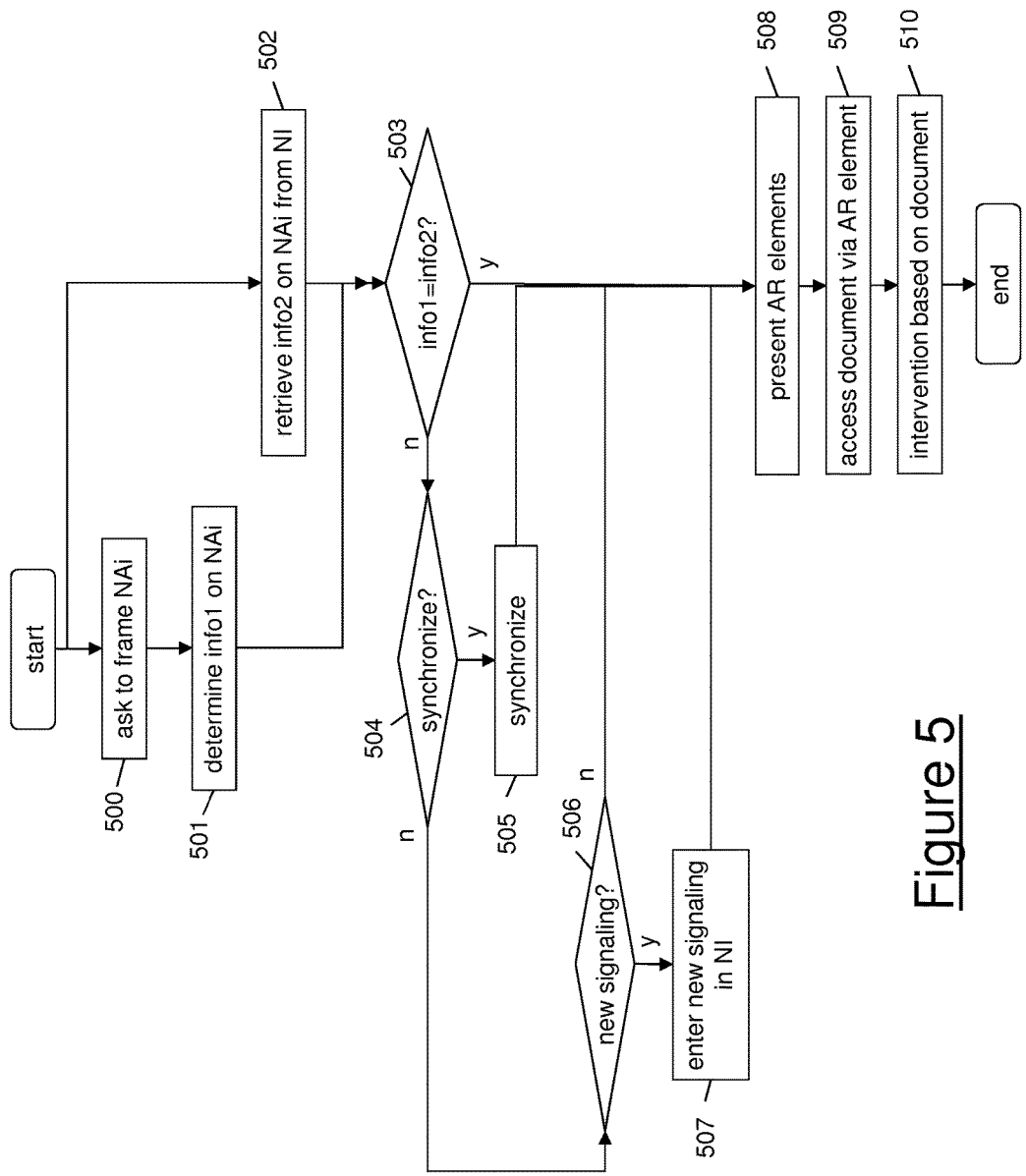
FIG. 5 is a flow chart of the operation of the system of FIG. 1, according to a second embodiment.

Then, the process preferably carries out a number of steps, which basically correspond to steps 200 to 207 shown in FIG. 2 and which are indicated as steps 500 to 507 in FIG. 5. Hence, a detailed description of such steps will not be repeated.

Then, at step 508, the process preferably presents (by means of the display of the terminal device TDj) at least one AR element superimposed to the image of the network apparatus NAi framed by the camera of the terminal device TDj.

In case an intervention on the whole apparatus NAi is needed, the at least one AR element preferably comprise one or more of:

(i) a graphical object (e.g. an arrow) indicating the position of one or more particular components of the network apparatus NAi (for example, the position of the power supply);

(ii) the identifier of the network apparatus NAi as retrieved from the network inventory NI;

(iii) a link to a geographical map wherein the position of the network apparatus NAi is shown;

(iv) a link to a list of technical documents relating to the network apparatus NAi. The list is preferably structured based on the various categories of technical documents (e.g. documents for installation, documents for configuration, documents for maintenance, etc.);

(v) a link to panel showing the alarms active of the network apparatus NAi;

(vi) a link to the list of notes and/or signaling left by other operator(s) that formerly intervened on the same network apparatus NAi;

(vii) a link to management systems suitable for executing some operations onto the network apparatus NAi, e.g. displaying information (on alarms or configuration, for instance), modifying information (e.g. changing configuration parameters), etc. For instance, the AR element may comprise a link to the network management system NMS, that allows the operator to interact with it e.g. for retrieving information from the Resource Proxy RPi of the network apparatus NAi.

The AR elements listed above are preferably displayed in a structured way, e.g. they may be grouped based on their category. For instance, a list of the available categories may be formerly displayed and, as the operator selects that category (e.g. by means of a voice command), a list of the AR elements in the selected category is displayed. A category may be for instance the general data of the network apparatus NAi, which comprises the AR elements (ii) and (iii).

In case an intervention on a specific component of the apparatus NAi is needed, the at least one AR element displayed at step 508 preferably comprise one or more of:
(i) a graphical object (e.g. an arrow) indicating the position of the component upon which the intervention shall be carried out;
(ii) the name of the component; and
(iii) a link to technical documents relating to the component.

Then, at step 509, the operator preferably selects one of the AR elements comprising a link, and visualizes the information accessible via the link and/or operates on the systems accessible via the link. In case the selected link provides access to documents, such documents may be downloaded either at the terminal device TDj or at a PC connected (e.g. via a wireless connection Bluetooth, Wi-Fi etc.) to the terminal device TDj.

Then, at step 510 the operator preferably carries out the intervention, with the aid of the documents and/or information from systems retrieved at step 509, and then notify to the process if he wishes to access to other documents and/or systems. In the affirmative, the process reverts to step 509 and the operator may select other AR elements and then access to other documents and/or systems.

Therefore, AR techniques not only ease provision of detailed instructions to the operator, but also ease consultation of technical documents and direct interaction between operator and network management system NMS, in case the intervention is not supported by any specific workflow providing detailed instructions.

Alternatively or in addition to the above described types of support offered to operators, the system OMS may also be configured to allow a remote (and possibly more expert) operator to support an in-field (and possibly less expert) operator in the execution of an intervention on the network apparatus NAi. In such case, therefore, the in-field operator receives instructions on how to intervene on the apparatus from a more experienced colleague.

The operation of the system OMS in this scenario is described herein after with reference to the flow chart of FIG. 6.

As the operator arrives into proximity of the network apparatus NAi, bringing with him its terminal device TDj, he requires to the personal proxy PPj to starts the execution of a process configured to support a communication session between in-field operator and remote operator. According to first variants, the process is a workflow. According to other variants, the process is a code directly written in a programming language (e.g. Java). According to still other variants, the process is part of a workflow configured to support a specific type of intervention on a given apparatus (or component of the apparatus), as shown in FIG. 2. In such case, the process may be invoked by the workflow during execution of step 211 shown in FIG. 2 (in other words, the in-field operator receives part of the instructions from the workflow, and part of the instructions from a remote operator). Alternatively, execution may be automatically started by a triggering event detected by the terminal device TDj. For instance, execution of the process may be automatically started as the terminal device TDj detects (e.g. by means of an RFID reader or a GPS receiver) that the operator is close to the network apparatus NAi. In such case, the personal proxy PPj preferably asks the operator to confirm that he wishes to start the execution of the process.

Figure 6:
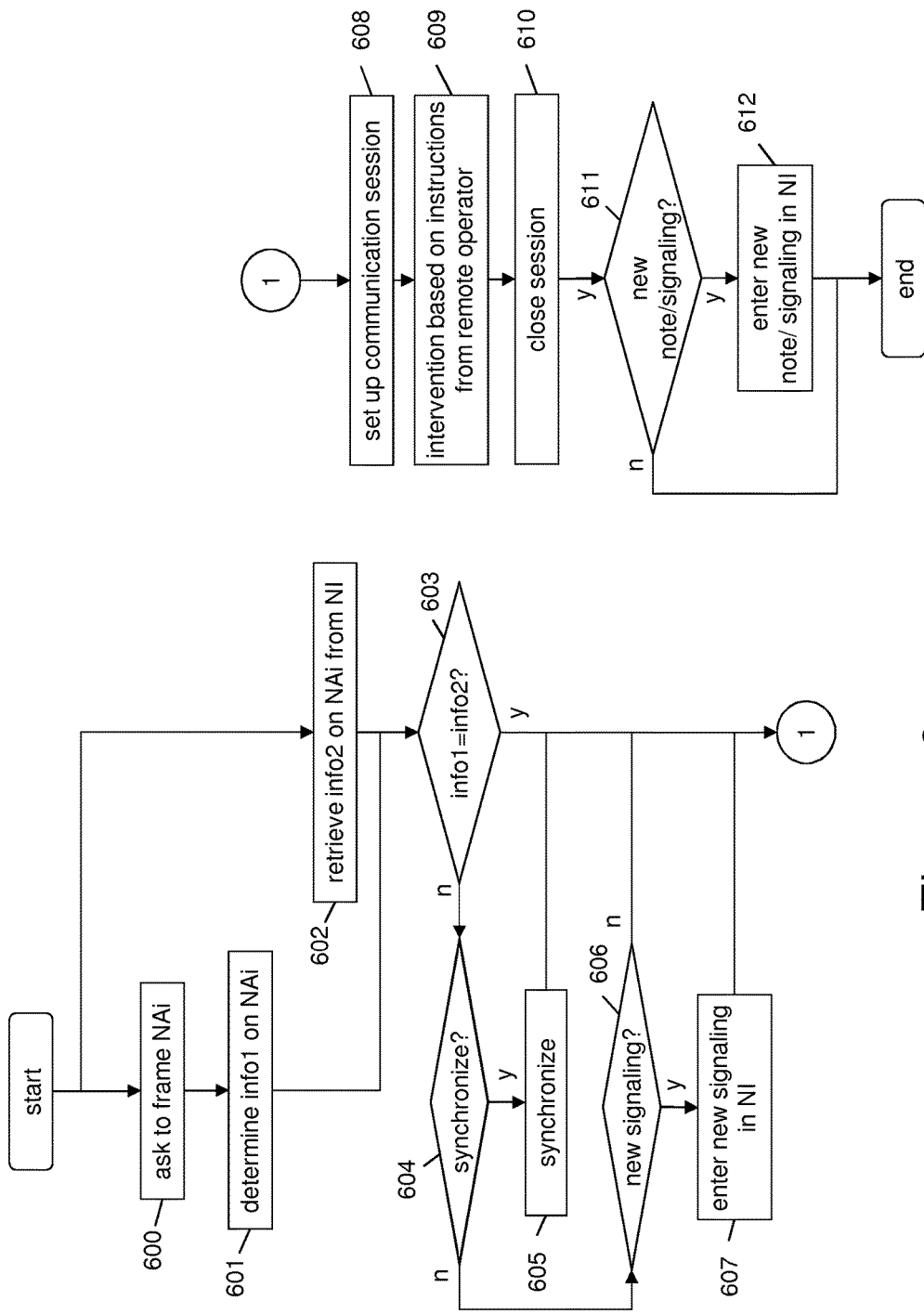
FIG. 6 is a flow chart of the operation of the system of FIG. 1, according to a third embodiment.

Then, the process preferably carries out a number of steps, which basically correspond to steps 200 to 207 shown in FIG. 2 and which are indicated as steps 600 to 607 in FIG. 6. A detailed description of such steps therefore will not be repeated.

Then, at step 608, the process preferably sets up a communication session with a remote device of the remote operator. The communication session may be for instance a live, audio-video communication session.

Then, at step 609, during the communication session the remote operator preferably provides to the in-field operator detailed instructions on the activities to be carried out. During such step, the remote operator is preferably presented with a virtual environment reproducing the real environment surrounding the in-field operator. According to first variants, the remote operator preferably provides instructions to the in-field operator by means of voice commands. According to other variants, the remote operator preferably emulates one or more manual activities on the virtual environment, e.g. by using an intelligent tactile tool (e.g. intelligent gloves). Such emulated activities are preferably presented to the in-field operator by AR techniques. For instance, a number of AR elements may be superimposed to the scene framed by the terminal device TDj of the network operator, which reproduce the activities emulated by the remote operator on the virtual environment. Upon emulation of each activity, the remote operator preferably awaits for a feedback from the in-field operator. According to preferred variants, the scene framed by the terminal device TDj of the in-field operator is show in real time on the terminal device of the remote operator, who accordingly may see in real time the activity of the in-field operator and provide him suggestions (e.g. in the form of voice messages). According to other variants, also the in-field operator is provided with an intelligent tactile tool (e.g. intelligent gloves), that guide him in the execution of each instruction provided by the remote operator.

Upon completion of the intervention, the process preferably closes the communication session (step 610).

Then, the process preferably carries our steps 611 and 612, which substantially correspond to steps 213 and 214 of FIG. 2. A detailed description of these steps therefore will not be repeated.

Therefore, AR techniques not only ease provision of detailed instructions to the operator by a workflow, but also ease provision of instructions to an in-field operator by a remote operator. This is advantageous both in real situations, where a less experienced operator may carry out complicated interventions with the aid of a more experienced colleague, and also in training sessions.

The invention claimed is:

1. A system for supporting an intervention to be carried out by a human operator on a network apparatus of a communication network, said system comprising a terminal device provided in equipment of said human operator, said terminal device being provided with a personal proxy, wherein said personal proxy is configured to:
   process a live view of at least a portion of said network apparatus for extrapolating first information on said network apparatus;
   retrieve second information on said network apparatus from network inventory of a network management system of said communication network;

compare said first information with said second information;
if a mismatch is detected between said first information and said second information, carry out a synchronization procedure of said network inventory;
provide to said human operator at least one instruction to carry out at least one operation of said intervention, by displaying at least one augmented reality element overwritten to said live view of at least a portion of said network apparatus;
cooperate with said network management system of said communication network for checking whether said at least one instruction was properly executed; and
report an outcome of said checking to said operator by displaying at least one further augmented reality element overwritten to said live view of at least a portion of said network apparatus.

2. The system according to claim 1, wherein said terminal device is a wearable device provided with a camera suitable for framing said live view, a transparent screen allowing said operator to see said live view therethrough, and a projector suitable for projecting at least one of said augmented reality element and said further augmented reality element on said screen.

3. The system according to claim 1, wherein said system further comprises an augmented reality server and wherein said personal proxy is provided with an augmented reality engine, said augmented reality server and said augmented reality engine being configured to cooperate according to a client-server scheme for generating and displaying at least one of said augmented reality element and said further augmented reality element overwritten to said live view.

4. The system according to claim 3, wherein said client-server scheme is one of the following:
a client-side scheme, wherein said augmented reality engine is configured to recognize said live view for generating the at least one of said augmented reality element and said further augmented reality element;
a server-side scheme, wherein said augmented reality server is configured to recognize said live view for generating the at least one of said augmented reality element and said further augmented reality element; or
a hybrid scheme, wherein said augmented reality engine is configured to cooperate with said augmented reality server to recognize said live view for generating the at least one of said augmented reality element and said further augmented reality element.

5. The system according to claim 1, wherein said system further comprises a tool proxy configured to manage a wearable intelligent tool comprised in the equipment of said human operator, said wearable intelligent tool being suitable for sensing movements of said human operator and to provide said human operator with tactile feedback, said personal proxy being further configured to cooperate with said tool proxy so as to guide said human operator while said human operator is carrying out said at least one operation wearing said intelligent tool.

6. The system according to claim 1, wherein said personal proxy is configured to, before carrying out said synchronization procedure, determine whether said human operator has synchronized said network inventory.

7. The system according to claim 6, wherein said personal proxy is further configured to, if said human operator has not synchronized said network inventory, allow said human operator to record in said network inventory a signaling indicating the detected mismatch.

8. The system according to claim 1, wherein said personal proxy is further configured to:
upon completion of said intervention, cooperate with said network management system of said communication network for checking whether said intervention was successful;
report said outcome of said checking whether said intervention was successful upon completion of said intervention to said operator, by displaying at least one still further augmented reality element overwritten to said live view of at least a portion of said network apparatus; and
if said outcome of said checking whether said intervention was successful upon completion of said intervention is negative, return to an instruction to carry out an operation of said intervention.

9. The system according to claim 1, wherein said personal proxy is further configured to:
provide to said human operator at least one additional instruction to carry out at least one additional operation of said intervention, by playing a voice message;
check whether said at least one additional instruction was properly executed; and
report, to said operator by playing a further voice message, said outcome of said checking whether said at least one additional instruction was properly executed.

10. The system according to claim 1, wherein said personal proxy is further configured to:
provide to said human operator at least one further instruction to carry out at least one further operation of said intervention;
check whether said at least one further instruction was properly executed by processing said live view of said at least a portion of said network apparatus; and
report, to said operator, said outcome of said checking whether said at least one further instruction was properly executed.

11. The system according to claim 1, wherein said personal proxy is further configured to generate a virtual image of said network apparatus and to display said virtual image of said network apparatus as a virtual layer interposed between said live view and the at least one of said augmented reality element and said further augmented reality element.

12. The system according to claim 1, wherein said personal proxy is further configured to display, overwritten to said live view of at least a portion of said network apparatus, at least one link allowing said human operator to access information on at least one of said network apparatus and one or more components of said network management system.

13. The system according to claim 1, wherein said personal proxy is further configured to set up a communication session between said terminal device of said human operator and a further terminal device of a remote further human operator, thereby allowing said further human operator to support said human operator during said intervention on said network apparatus.

14. A method for supporting an intervention to be carried out by a human operator on a network apparatus of a communication network, wherein said method comprises the following steps, carried out by a personal proxy executed by a terminal device comprised in equipment of said human operator:
processing a live view of at least a portion of said network apparatus for extrapolating first information on said network apparatus;

retrieving second information on said network apparatus from network inventory of a network management system of said communication network;

comparing said first information with said second information;

if a mismatch is detected between said first information and said second information, carrying out a synchronization procedure of said network inventory;

providing to said human operator at least one instruction to carry out at least one operation of said intervention, by displaying at least one augmented reality element overwritten to said live view of at least a portion of said network apparatus;

cooperating with said network management system of said communication network for checking whether said at least one instruction was properly executed; and reporting an outcome of said checking to said operator by displaying at least one further augmented reality element overwritten to said live view of at least a portion of said network apparatus.

15. A non-transitory computer readable medium including software code portions stored therein that, when executed by at least one computer perform the steps of the method of claim 14.

16. The method according to claim 14, further comprising:

setting up a communication session between said terminal device of said human operator and a further terminal device of a remote further human operator, thereby allowing said further human operator to support said human operator during said intervention on said network apparatus.

17. The method according to claim 14, further comprising:

upon completion of said intervention, cooperating with said network management system of said communication network for checking whether said intervention was successful;

reporting said outcome of said checking whether said intervention was successful upon completion of said intervention to said operator, by displaying at least one still further augmented reality element overwritten to said live view of at least a portion of said network apparatus; and if said outcome of said checking whether said intervention was successful upon completion of said intervention is negative, returning to an instruction to carry out an operation of said intervention.

18. The method according to claim 14, further comprising:

providing to said human operator at least one additional instruction to carry out at least one additional operation of said intervention, by playing a voice message;

checking whether said at least one additional instruction was properly executed; and reporting, to said operator by playing a further voice message, said outcome of said checking whether said at least one additional instruction was properly executed.

19. The method according to claim 14, further comprising:

providing to said human operator at least one further instruction to carry out at least one further operation of said intervention;

checking whether said at least one further instruction was properly executed by processing said live view of said at least a portion of said network apparatus; and reporting, to said operator, said outcome of said checking whether said at least one further instruction was properly executed.

20. The method according to claim 14, further comprising:

generating a virtual image of said network apparatus and to display said virtual image of said network apparatus as a virtual layer interposed between said live view and the at least one of said augmented reality element and said further augmented reality element.

* * * * *